(12) United States Patent
Sporer et al.

(10) Patent No.: US 7,981,530 B2
(45) Date of Patent: Jul. 19, 2011

(54) DYSPROSIA STABILIZED ZIRCONIA ABRADABLE

(75) Inventors: Dieter R. Sporer, Sonthofen (DE);
Ulrike Taeck, Auenstein (CH); Mitchell R. Dorfman, Westbury, NY (US);
Andrew R. Nicoll, Wohlen (CH);
Massimo Giannozzi, Florence (IT);
Iacopo Giovannetti, Florence (IT)

(73) Assignee: Sulzer Metco (US), Inc., Westbury, NY (US)

( * ) Notice: Subject to any disclaimer, the term of this patent is extended or adjusted under 35 U.S.C. 154(b) by 884 days.

(21) Appl. No.: 11/808,244

(22) Filed: Jun. 7, 2007

(65) Prior Publication Data

US 2008/0124548 A1    May 29, 2008

Related U.S. Application Data

(60) Provisional application No. 60/811,799, filed on Jun. 8, 2006.

(51) Int. Cl.
*B32B 9/00* (2006.01)
*C23C 4/10* (2006.01)

(52) U.S. Cl. ........ 428/701; 428/702; 428/698; 427/453; 416/241 B

(58) Field of Classification Search .................. None
See application file for complete search history.

(56) References Cited

U.S. PATENT DOCUMENTS

| | | | | |
|---|---|---|---|---|
| 3,957,500 A * | 5/1976 | Pitts | ............. | 501/103 |
| 4,936,745 A * | 6/1990 | Vine et al. | ............. | 415/173.4 |
| 6,660,405 B2 | 12/2003 | Lau et al. | | |
| 6,812,176 B1 | 11/2004 | Zhu et al. | | |
| 6,835,465 B2 * | 12/2004 | Allen et al. | ............. | 428/632 |
| 6,869,550 B2 * | 3/2005 | Dorfman et al. | ............. | 264/5 |
| 6,946,208 B2 | 9/2005 | Subramanian et al. | | |
| 7,258,934 B2 * | 8/2007 | Wigren et al. | ............. | 428/699 |
| 2006/0024513 A1 * | 2/2006 | Schlichting et al. | ............. | 428/457 |
| 2007/0207271 A1 * | 9/2007 | Mueller et al. | ............. | 427/453 |
| 2010/0075147 A1 * | 3/2010 | Doesburg et al. | ............. | 428/402 |

FOREIGN PATENT DOCUMENTS

| | | |
|---|---|---|
| EP | 1400611 A1 | 3/2004 |
| EP | 1550642 A2 | 7/2005 |
| EP | 1550644 A1 | 7/2005 |
| EP | 1588992 A1 | 10/2005 |
| EP | 1627862 A1 | 2/2006 |
| EP | 1772441 A1 | 4/2007 |
| EP | 1793010 A1 | 6/2007 |
| EP | 1829824 A1 | 9/2007 |
| WO | 0245931 A1 | 6/2002 |

OTHER PUBLICATIONS

Schmid, R., "New High Temperature Abradables for Gas Turbines," Dissertation (1997), Swiss Federal Institute of Technology, Zurich.
Schmid, R.K., et al., "An Overview of Compressor Abradables," International Thermal Spray Conference (ITSC) 2000, pp. 1087-1093, Montreal, Canada.
Sporer, D.R. and Shiembob, L.T., "Alloy Selection for Honeycomb Gas Path Seal Systems," (2004), Proceedings of ASME Turbo Expo 2004, GT2004-53115.
Chupp, R.E. et al., "Development of Higher Temperature Abradable Seals for Gas Turbine Applications," (2004), Proceedings of ASME Turbo Expo 2004, GT2004-53029.
Weatherill, A., "Strain Tolerant Ceramic Coating for Protection of Rotating Blade Tips," Journal Spraytime, vol. 13, No. 2, $2^{nd}$ Quarter 2006, International Thermal Spray Association (2006).

* cited by examiner

*Primary Examiner* — Timothy M Speer
(74) *Attorney, Agent, or Firm* — Greenblum & Bernstein, PLC

(57) ABSTRACT

Ceramic abradable materials, in particular thermally sprayable ceramic abradable powder materials, and abradable seals formed by thermally spraying the materials include dysprosia ($Dy_2O_3$) and zirconia ($ZrO_2$). Coatings are porous whereby the porosity, in part, is induced by plastic or fugitive phases. Abradable seal coatings comprising dysprosia and zirconia exhibit improved thermal shock and sintering resistance and can be worn into tolerance by untreated, bare turbine blades, at least in certain regimes of relative blade speed and coating porosity. Ceramic abradable seal coatings comprising dysprosia and zirconia can be used up to 1200° C.

21 Claims, 15 Drawing Sheets

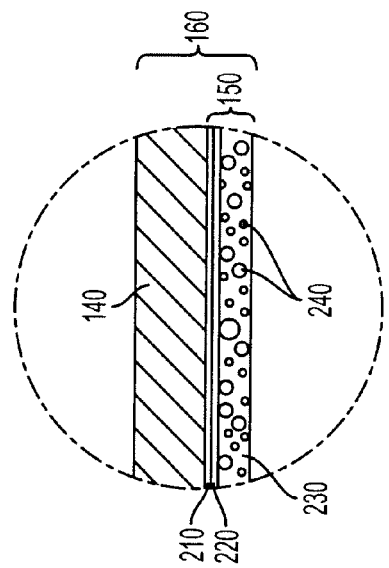
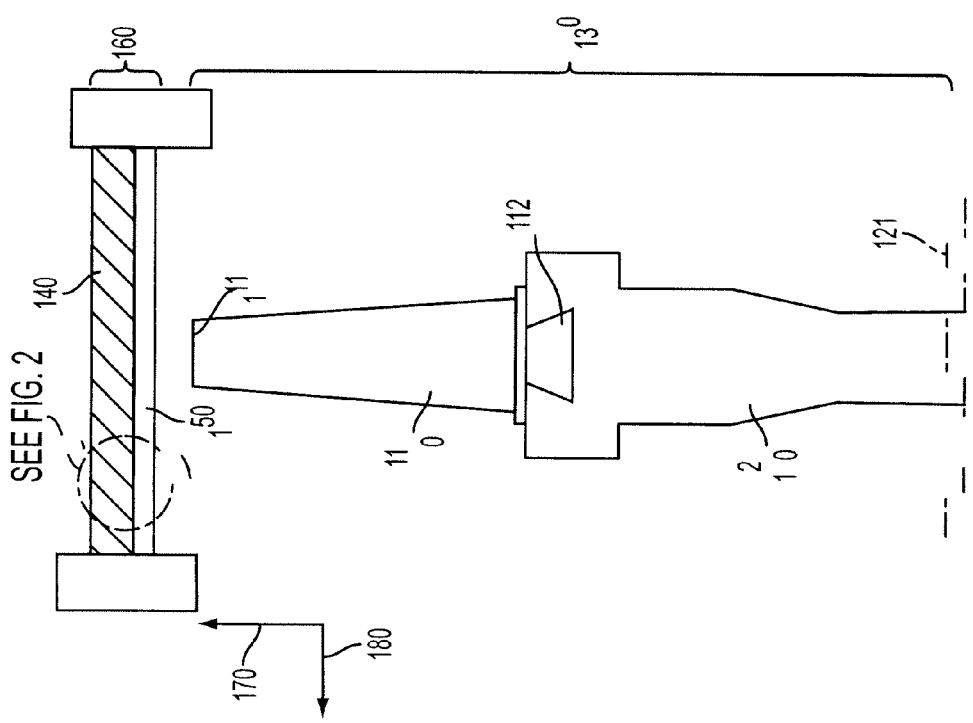

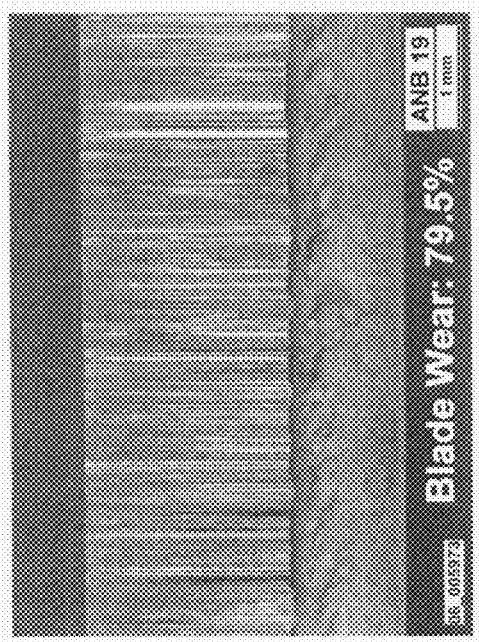
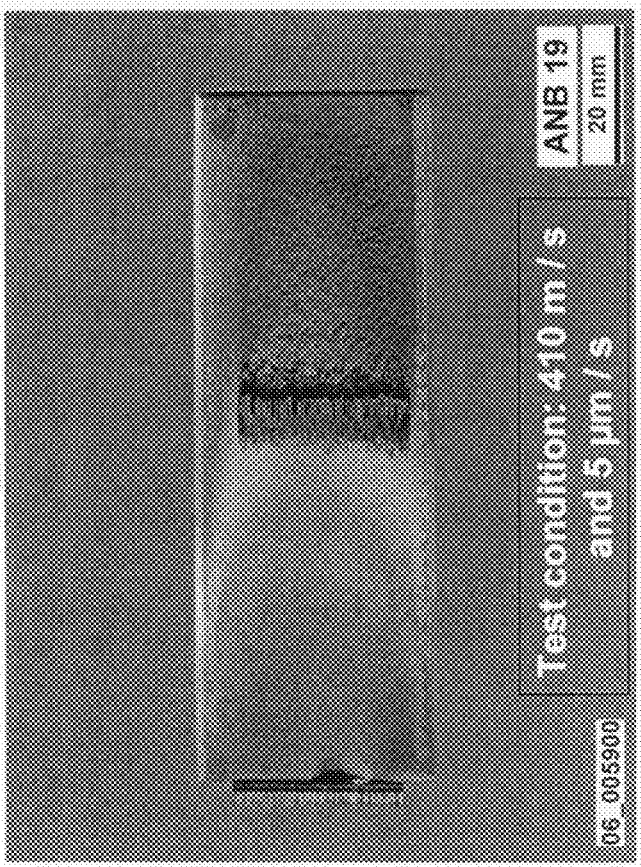
Fig. 13A
Fig. 13B

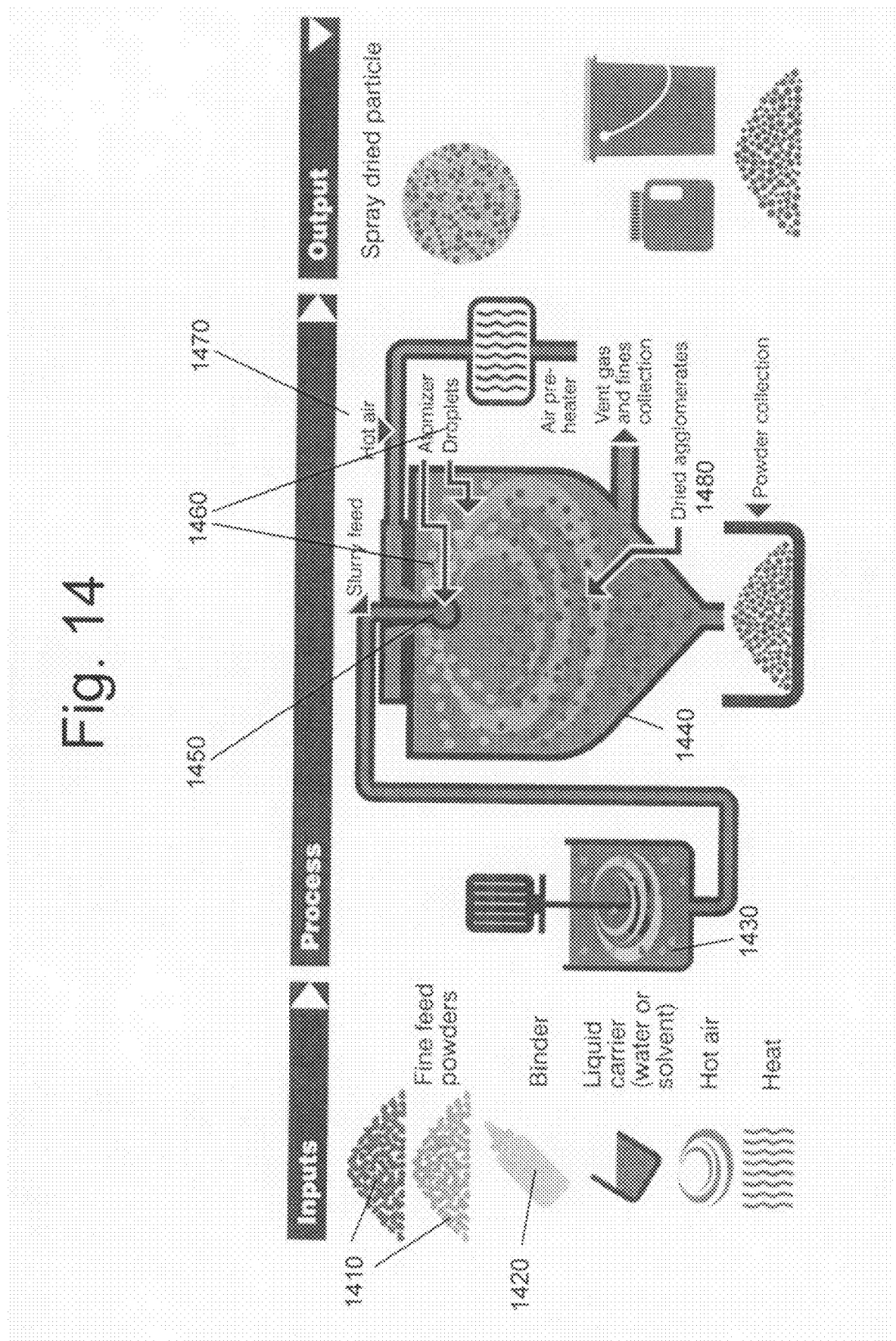

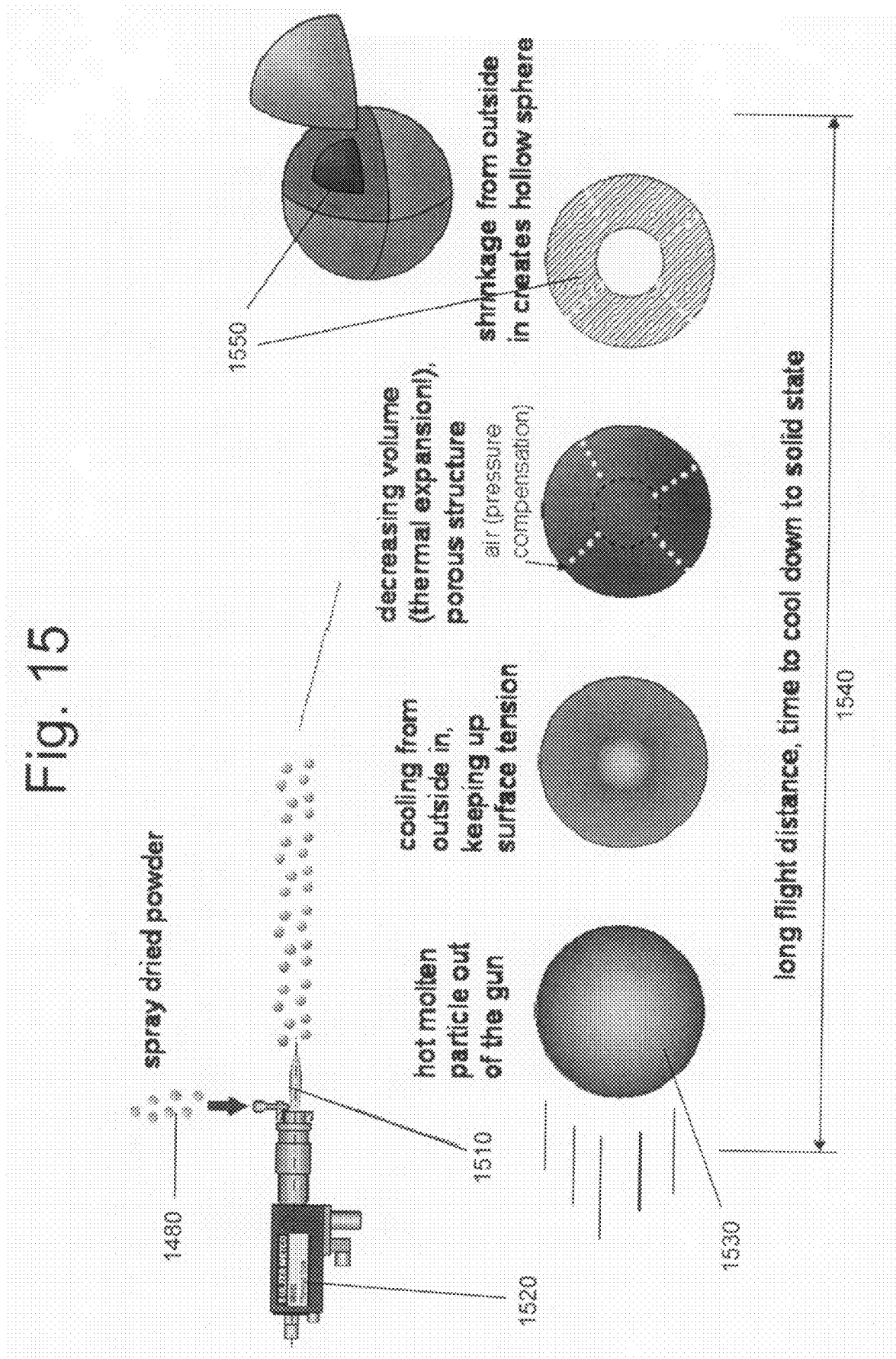

DYSPROSIA STABILIZED ZIRCONIA ABRADABLE

CROSS REFERENCE TO RELATED APPLICATIONS

This application claims priority under 35 U.S.C. §119(e) from U.S. Provisional Patent Application No. 60/811,799, filed on Jun. 8, 2006, which is incorporated herein in its entirety by reference.

STATEMENT REGARDING SPONSORED RESEARCH OR DEVELOPMENT

Not Applicable.

REFERENCE TO SEQUENCE LISTING

Not Applicable.

BACKGROUND OF THE INVENTION

1. Field of the Invention

The invention relates generally to the field of clearance control or abradable materials. More particularly, the invention relates to a ceramic abradable material and, even more particularly, to a ceramic abradable coating that includes dysprosia and zirconia where the dysprosia serves the purpose of a stabilizer and also imparts a dramatic improvement in thermal shock resistance and abradability to the abradable coating compared to prior art abradable coatings.

2. Description of Related Art

In an aircraft or stationary gas turbine engine there is a host of air or gas seal locations. All of these sealing positions are significant with regards to safe and efficient engine operation. Efforts have continued over the last several years to improve efficiency and power output of new and existing turbines. Improvements in sealing between rotating and stationary parts in gas turbine engines can significantly reduce parasitic leakages and thereby improve performance by increasing both efficiency and power output. Abradable seals have been used in jet engines since the late 1960's and they are gaining ever more attention in industrial turbines as a relatively simple means to reduce gas path tip clearances. They offer clearance reductions at relatively low cost and minor engineering implications for new and fleet units. These materials are applied to the casing or shrouds of gas or steam turbine engines and are worn-in by the rotating blades during operation. The result is decreased clearances to levels difficult to achieve otherwise.

In the compressor section of engines the abradable seals are applied by thermal spraying metals or metal composite materials. Today gas path sealing on the turbine side is mostly achieved through brazed all-metallic honeycomb seals which, together with fins on shrouded turbine blades, form an effective labyrinth type seal. Recently, however, efforts have been undertaken to provide thermally sprayed, metallic high temperature sealing solutions for up to 950° C. in long term service and being used with unshrouded turbine blades. For even higher temperatures, metallic materials no longer provide the necessary oxidation and hot gas corrosion resistance and ceramic materials will have to be taken into consideration for seals operating at up to 1200° C. or even higher.

Conventional gas turbine engines may use porous ceramic abradable materials such as yttria ($Y_2O_3$) stabilized zirconia ($ZrO_2$), YSZ. Previously, an abradable seal material made of zirconia stabilized with 6-8 wt % yttria ($Y_2O_3$) as used in standard thermal barrier coatings (TBCs) has been disclosed. Although such standard YSZ materials are basically suited for use as abradable materials, their performance in this application is far from optimum in terms of thermal shock behavior, sintering resistance, and their potential inability to be cut by unshrouded blades having untreated, bare alloy blade tips.

Other references have disclosed a multilayer abradable thermal barrier coating system that is softer and more resistive to sintering than prior art materials and comprises a ytterbia ($Yb_2O_3$) stabilized zirconia or YbSZ, in one of the ceramic layers whereby the ytterbia concentration in that ceramic layer is at least 50 wt %. These references describe abradability of this system when tested against silicon carbide (SiC) tipped blades and discloses advantages in abradability of the invention coatings over prior art YSZ such as 8 wt % yttria stabilized zirconia (8YSZ) after having been exposed to a 1200° C. sintering treatment.

Ceramic abradable coatings require a special profile of characteristics to ensure their optimal performance as a high temperature abradable seal. One aspect that needs to be considered is that abradables, unlike thermal barrier coatings, have a requirement for relatively thick coatings to accommodate the design incursion depth on top of a certain minimum thickness. This challenges another important property of the ceramic abradable coating, namely the coating's resistance to spallation during thermal shock loading which generally decreases with increasing coating thickness. There remains a need in the art to provide a seal with improved thermal shock resistance.

Because the ceramics described above are abrasive to metallic materials, ceramic abradables generally require hard tipping of the blades rubbing against it so as to prevent excessive damage of the metallic blade tip. Typical commercial blade hard tipping solutions make use of ultra-hard ceramic materials such as cubic boron nitride (cBN) or silicon carbide (SiC) in an oxidation resistant metal matrix. While such abrasive tipping improves the cutting behavior of the blades, it is expensive to apply and an optimized ceramic abradable system should avoid the need for hard tipping by providing improved cuttability or abradability of the seal. Thus, there remains a need in the art to provide a ceramic seal that shows improved abradability.

SUMMARY OF THE INVENTION

The invention is directed to ceramic abradable materials used for clearance control between turbine blade tips and the shroud or casing in turbine engines for steam, industrial and aerospace applications. The ceramic abradable in accordance with embodiments of the invention is a generally porous abradable that provides for significantly increased thermal shock resistance as well as the ability of untreated, bare turbine blade tips to cut into the abradable without damaging the tip.

Embodiments of the present invention provide a ceramic abradable material that comprises dysprosia ($Dy_2O_3$) and zirconia ($ZrO_2$). Generally, the material may include dysprosia in the range of about 2 to 50 wt %, with the balance, minus impurities, being zirconia. In accordance with one embodiment of the invention, about 10 wt % of dysprosia is added to zirconia to provide a 10 wt % dysprosia stabilized zirconia or 10 DySZ. The abradable composition according to this embodiment demonstrates a three- to four-fold improvement in thermal shock resistance combined with a significantly improved erosion resistance and abradability as compared to conventional YSZ compositions. In accordance with embodiments of the invention it also provides for the application of the dysprosia stabilized zirconia composition for sealing components in turbine engines.

The invention thus provides ceramic abradable seals outperforming conventional seals in thermal shock resistance, erosion resistance and in the ability to be cut by turbine blade tips.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 1 shows a schematic longitudinal cross section of a turbine engine stage including the abradable material according to the present invention;

FIG. 2 shows an enlarged section of the abradable coating in accordance with the invention;

FIGS. 11A-B, 12A-B and 13A-B show the condition of blade tip and abradable coating, including a coating in accordance to an embodiment of the present invention, after testing at 1100° C. and according to selected test parameters of FIG. 9;

FIG. 14 illustrates a process of preparing a thermally sprayable ceramic abradable powder composition in accordance with the present invention;

FIG. 15 illustrates a process of plasma densification and alloying of a thermally sprayable ceramic abradable powder composition.

DETAILED DESCRIPTION OF THE INVENTION

Figure 3:
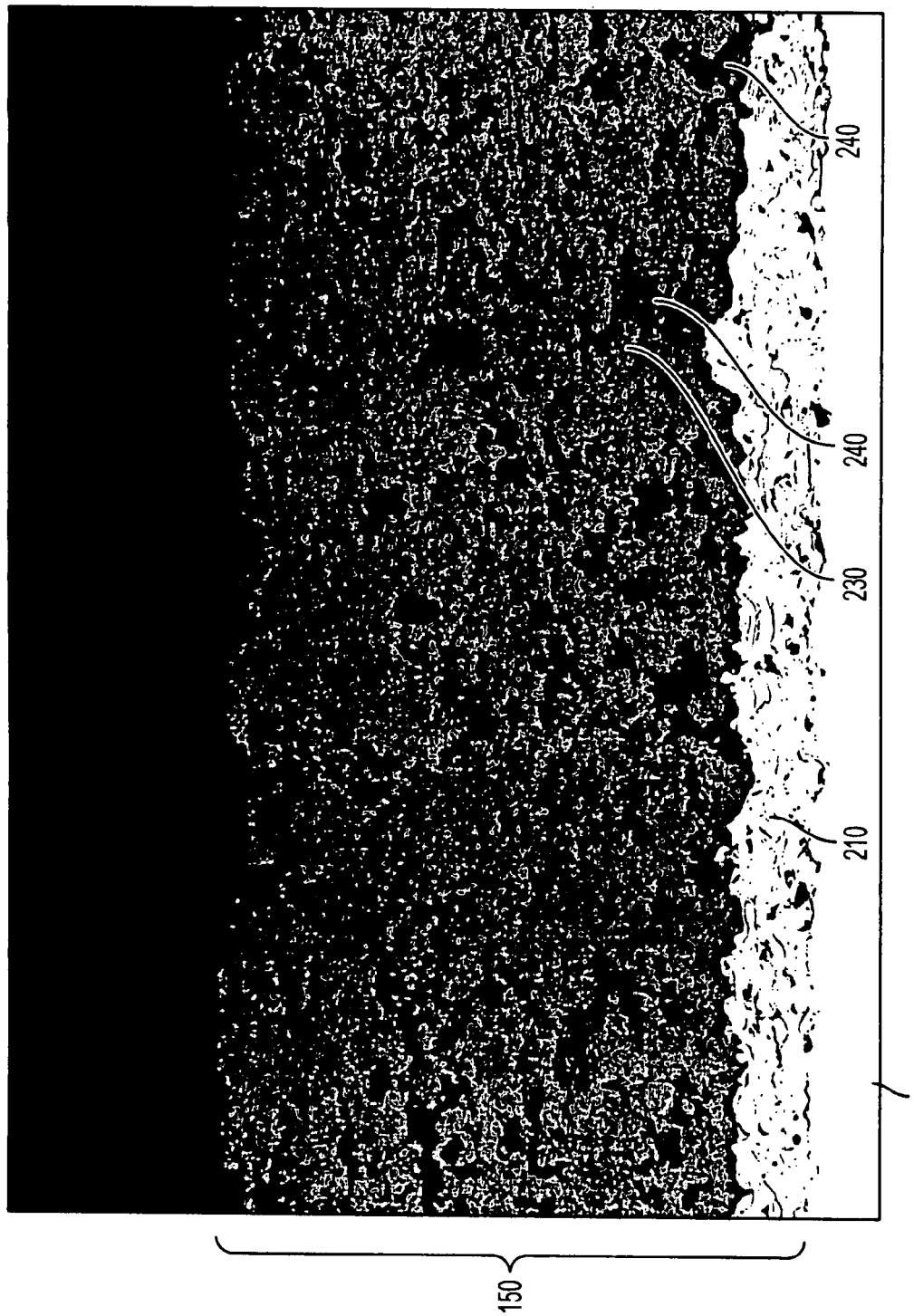
FIG. 3 shows a cross-sectional photomicrograph of an actual abradable coating representing a preferred embodiment of the present invention.

Reference will now be made in detail to the preferred embodiments of the present invention, examples of which are illustrated in the accompanying drawings.

FIG. 1 illustrates a cross-sectional view of a stage of a turbine engine consisting of a rotor 130 and a static shroud or casing 160. FIG. 1 shows a blade 110 that, through its blade root 112, is affixed to a rotating disc 120 that rotates around an axis 121. Hot gases passing over the blade 110 in the direction 180 impart rotational movement to the blade/disc assembly. The blade has a tip 111 that may be bare or carry an abrasive on it. The blade 110 and the disc 120 form the rotor part of the turbine engine stage that rotates around the axis 121. FIG. 1 also shows a casing 160 which acts to house the pressurized turbine stage and guides the gases to flow over the turbine blade 120 in a direction 180 or parallel to the casing wall 160. The casing wall 160 consists of a casing metal construction 140, which may be provided as an annular casing ring or as a segmented ring and carrying a seal coating system 150 on it. The coating system 150 on the casing metal construction 140 acts as an abradable seal material between the blade tip 111 of the blade 110 and the casing metal construction 140. The abradable seal coating system 150 in accordance with the present invention includes dysprosium oxide ($Dy_2O_3$) stabilized zirconium oxide ($ZrO_2$) as the abradable seal material in the top coat. The content of the $Dy_2O_3$ stabilizer in the top coat of the coating system according to the present invention may be generally in the range of about 2 to 50 wt % $Dy_2O_3$, balance, apart from impurities, $ZrO_2$. The results and descriptions below refer to an embodiment of the invention using abradable seal material having about 8-12 wt % $Dy_2O_3$ and balance, apart from impurities, $ZrO_2$ referred to as dysprosia stabilized zirconia or DySZ.

In operation the blade 110 rotates at very high rotational speeds and in a high temperature, high gas speed environment. In order to maximize the gas flow over the blade 110 and avoid over-tip leakage flow, the gap between the blade tip 111 and the casing 160 needs to be kept very small. During turbine engine operation, radial movement of the rotor assembly 130 in a direction 170 may bring the fast rotating blade 110 into repeated contact with the abradable seal coating system 150 which hence needs to be designed in a way that the blade tip 111 can cut into the seal coating system 150 without damaging the blade 120 or the casing metal construction 140. The seal material in accordance with the present invention allows a bare or uncoated blade tip 111 to cut into the ceramic abradable seal coating system 150 at high relative speeds. The abradable seal coating system according to embodiments of the present invention is further characterized by excellent thermal shock resistance and good resistance to erosion so that overall a significantly improved abradable seal coating system is provided when compared to the state-of-the-art.

FIG. 2 shows an enlarged section A of the casing wall 160, including casing or shroud metal construction 140 and ceramic abradable seal coating system 150. FIG. 2 shows that the ceramic abradable seal coating system 150 includes three particular layers: a bond coat 210, a thermally grown oxide layer 220 and finally a ceramic top coating 230. The ceramic top layer 230 of the ceramic seal system 150 has coarse porosity 240. In an embodiment of the present invention, the porosity 240 of the ceramic top coat 230 is achieved by thermally spraying the ceramic coating 230 using a ceramic powder abradable material that, apart from the dysprosia stabilized zirconia (DySZ), contains a fugitive filler phase such as a polymer or a polymer/ceramic (such as, e.g., hBN) compound. During spraying such a powder to produce a ceramic top layer 230, the fugitive filler phase is deposited together with and interdispersed in the ceramic phase and can subsequently be removed by a heat treatment of the abradable coating system 150 to produce porosity 240.

The bond coat 210 is made from a bond coat material such as a nickel aluminide (NiAl), a cobalt aluminide (CoAl), a platinum aluminide (PtAl) or a commonly used MCrAlY type material where M=Ni or Co or mixtures thereof. Such bond coats may be applied by flame spraying, plasma spraying such as atmospheric plasma spraying (APS), HVOF spraying, sputtering or physical vapor deposition (PVD). The thermally grown oxide layer 220 at the interface of bond coat 210 and ceramic top coat 230 may only develop during high temperature exposure of the ceramic seal coating system and is shown here for reference only.

In an embodiment of the present invention the bond coat 210 is a NiCrAlY material with nominally 22 wt % Cr, 10 wt % Al, 1.0 wt % Y, and rest, apart from impurities, Ni. This bond coat material is a gas atomized powder available from Sulzer Metco under the product designation AMDRY 962. Coatings made from AMDRY 962 are typically applied by APS. A spray parameter used to spray an AMDRY 962 bond coat is given in Table 1.

TABLE 1

Spray parameter used to produce AMDRY 962 bond coat (ref.: 05C0422)

| Gun: | Sulzer Metco 9MB |
|---|---|
| Nozzle: | GH/732 |
| Carrier gas: | Ar; 5 nlpm |
| Powder feed rate: | 150 g/min |
| Spray distance: | 75 mm |
| Primary gas: | Ar; 37 nlpm |
| Secondary gas: | $H_2$; 8.8 nlpm |
| Arc current: | 410 A |
| Voltage: | 62.5 V |

In a further embodiment of the invention the top coat 230 is 10 wt % dysprosium oxide stabilized zirconia (10 DySZ) that has coarse porosity 240 which was introduced into the top coating 230 by adding 5 wt % of a polymer composite fugitive filler to the 10 DySZ dysprosium stabilized zirconia spray powder and burning the polymer that was retained in the sprayed coating by heat treating the coating at 480° C. for 8 hours. While 5 wt % filler was used in this embodiment, other amounts of filler could be used. For example, fugitive fillers may range from 0.3 to 15 total wt % prior to deposition. The top coat 230 was applied by APS using a spray parameter as detailed in Table 2.

TABLE 2

Spray parameter used to produce 10 DySZ top coat (ref.: 05C0422)

| Gun: | Sulzer Metco 9MB |
|---|---|
| Nozzle: | GH/732 |
| Carrier gas: | Ar; 9 nlpm |
| Powder feed rate: | 52 g/min |
| Spray distance: | 75 mm |
| Primary gas: | Ar; 40 nlpm |
| Secondary gas: | $H_2$; 14.0 nlpm |
| Arc current: | 480 A |
| Voltage: | 70.4 V |

Top coat 230 and bond coat 210 of the embodiment of the present invention as detailed above are shown in FIG. 3, which shows the ceramic coating system 150 deposited on a Ni based casing metal material 140. FIG. 3 shows the coating system 150 consisting of AMDRY 962 bond coat 210 and 10 DySZ top coat 230 having polymer induced porosity 240 prior to burning off the polymer phase so that the top coat porosity 240 in FIG. 3 is still filled with polymer. The coating system 150 as shown in FIG. 3 was measured to have a polymer-filled porosity of 29.9 vol % which represents a further preferred embodiment of the invention while, in general, the porosity levels according to the present invention can range from about 15.0 vol % to 45.0 vol %.

Figure 4:
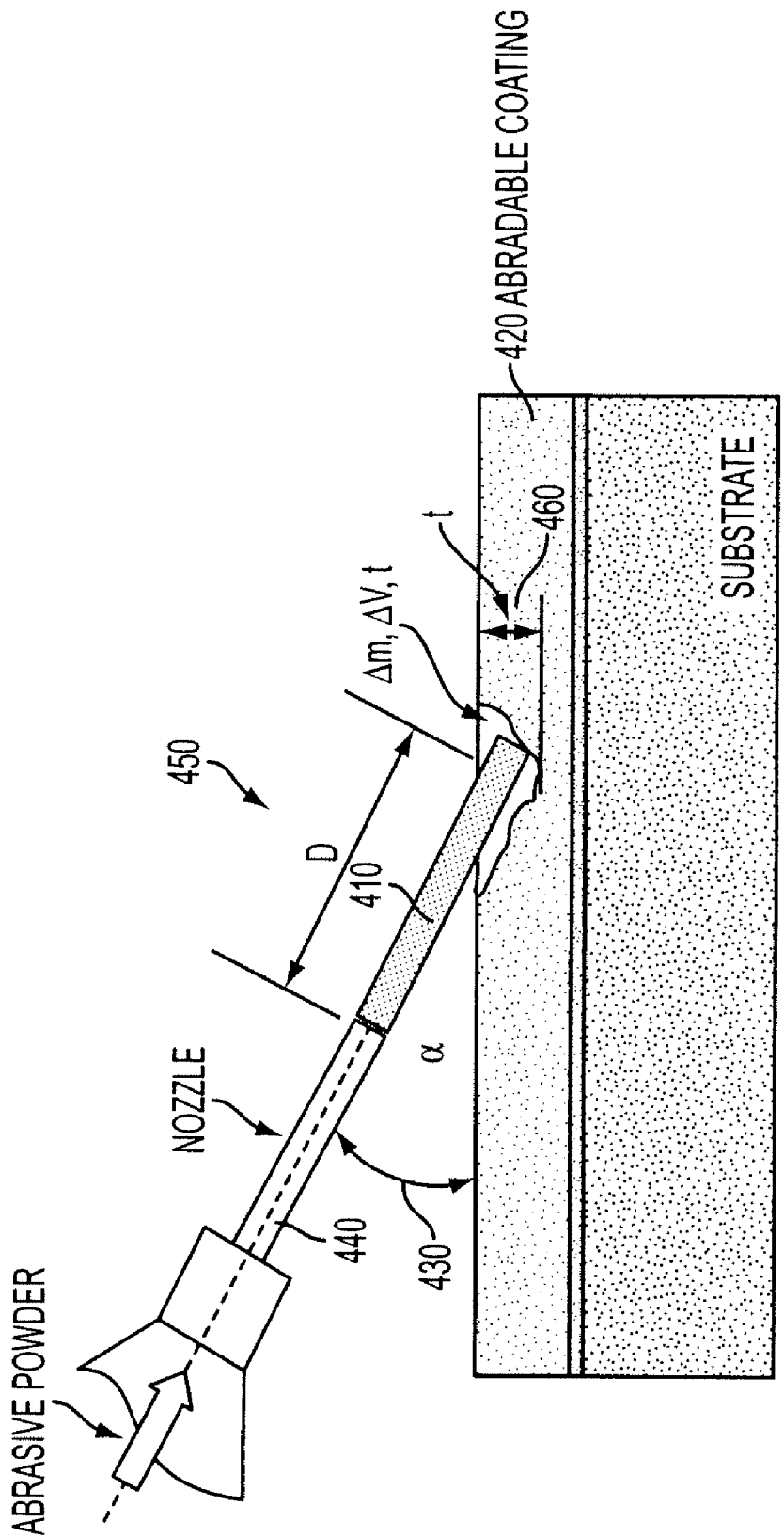
FIG. 4 shows a testing set up for testing erosion resistance of the ceramic abradable material in accordance with the present invention.

FIG. 4 shows a set-up for evaluating the erosion resistance of abradable coatings. A beam of abrasive grit particles 410 is directed to the surface of the abradable coating 420 at an angle 430. The beam of abrasive grit 410 is formed by introducing abrasive powder into a stream of pressurized air and discharge from a nozzle 440 that has a stand-off distance 450 to the surface of the abradable coating 420. Ceramic abradable top coatings 420 according to the present invention were tested using the following parameters: abrasive grit: 600 grams of 50 µm particle size aluminum oxide; impingement angle 430: 20°; stand-off distance 450: 100 mm. The deepest point 460 of top coat erosion is measured with a ball micrometer and the erosion number E calculated from the test as:

$$E = \text{Test time(s)}/[\text{Depth of Erosion (inch)} \times 1000]$$

The erosion number E is expressed in s/mil and represents the time in seconds to erode 1/1000 of an inch (25.4 µm) of the top coat thickness. According to this, a higher erosion number E means a better erosion resistance.

Figure 5:
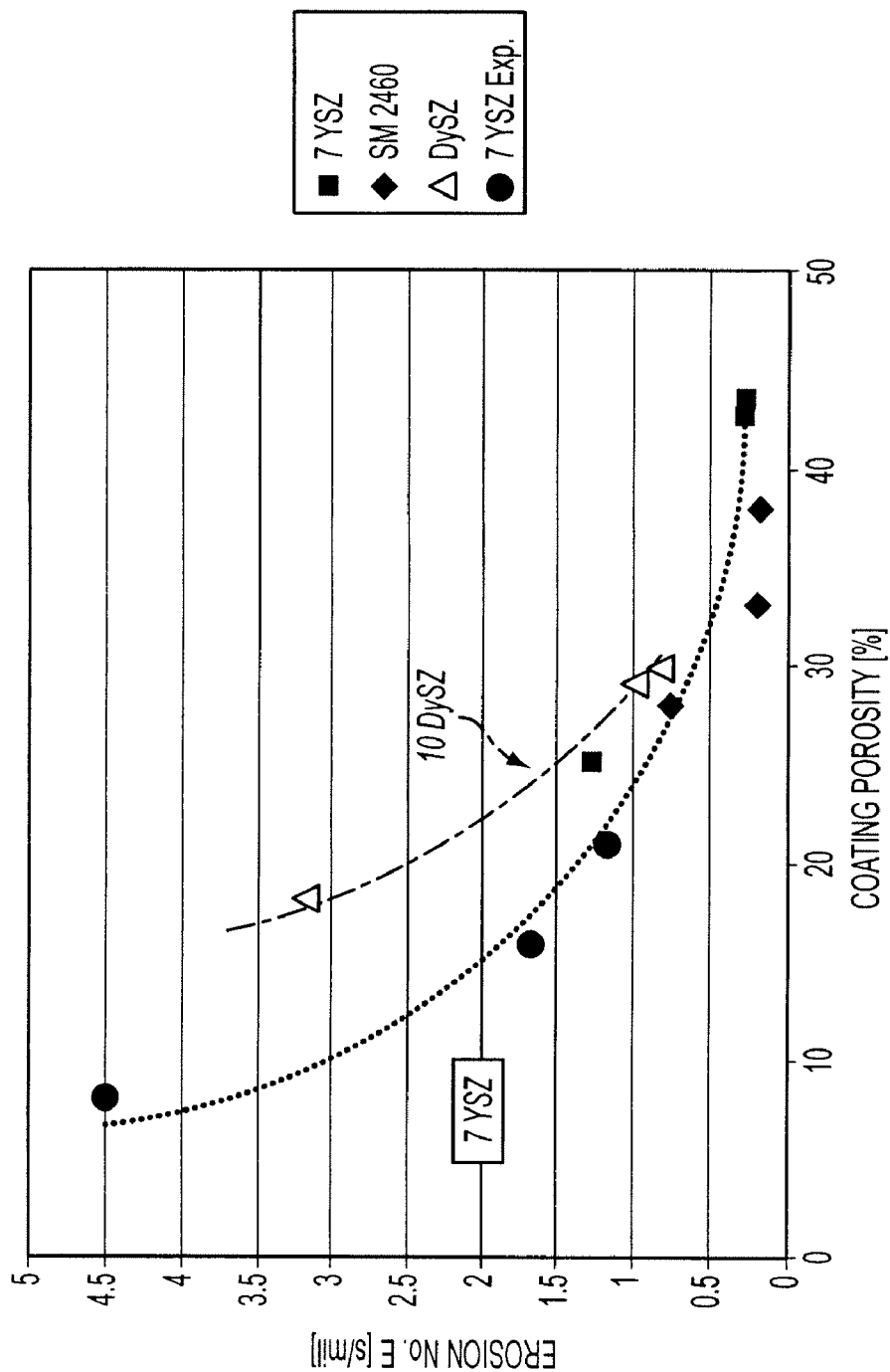
FIG. 5 is a graph showing the erosion resistance of state-of-the art and novel ceramic abradable materials according to the present invention at room temperature.

FIG. 5 shows the results of erosion tests as described above carried out for various ceramic top coats having various degrees of porosity. The graph includes results for coatings produced from a commercially available ceramic abradable material, SM 2460, which is a composite material consisting of 6-8 wt % yttria stabilized zirconia and 4 wt % polyester. The graph also shows results for an experimental yttria stabilized zirconia (7 YSZ) material blended with 5 wt % of the same polymer compound as described above as an addition to the 10 DySZ material. Top coatings having various levels of total porosity were created by varying the parameter as shown in Table 2. All coatings depicted in FIG. 5 were sprayed using a Sulzer Metco 9 MB plasma gun and the same powder feeders and control consoles as described above. FIG. 5 shows the general trend of decreasing erosion resistance with increasing ceramic top coat porosity. For a given top coat porosity, the 10 DySZ material according to the present invention shows the best erosion values. Results of E>0.7 s/mil appear acceptable for use in turbine engines as this is the erosion number of a typical 7 YSZ thermal barrier coating (TBC) currently used on turbine hardware when measured with the set-up as described in FIG. 4.

Figure 6:
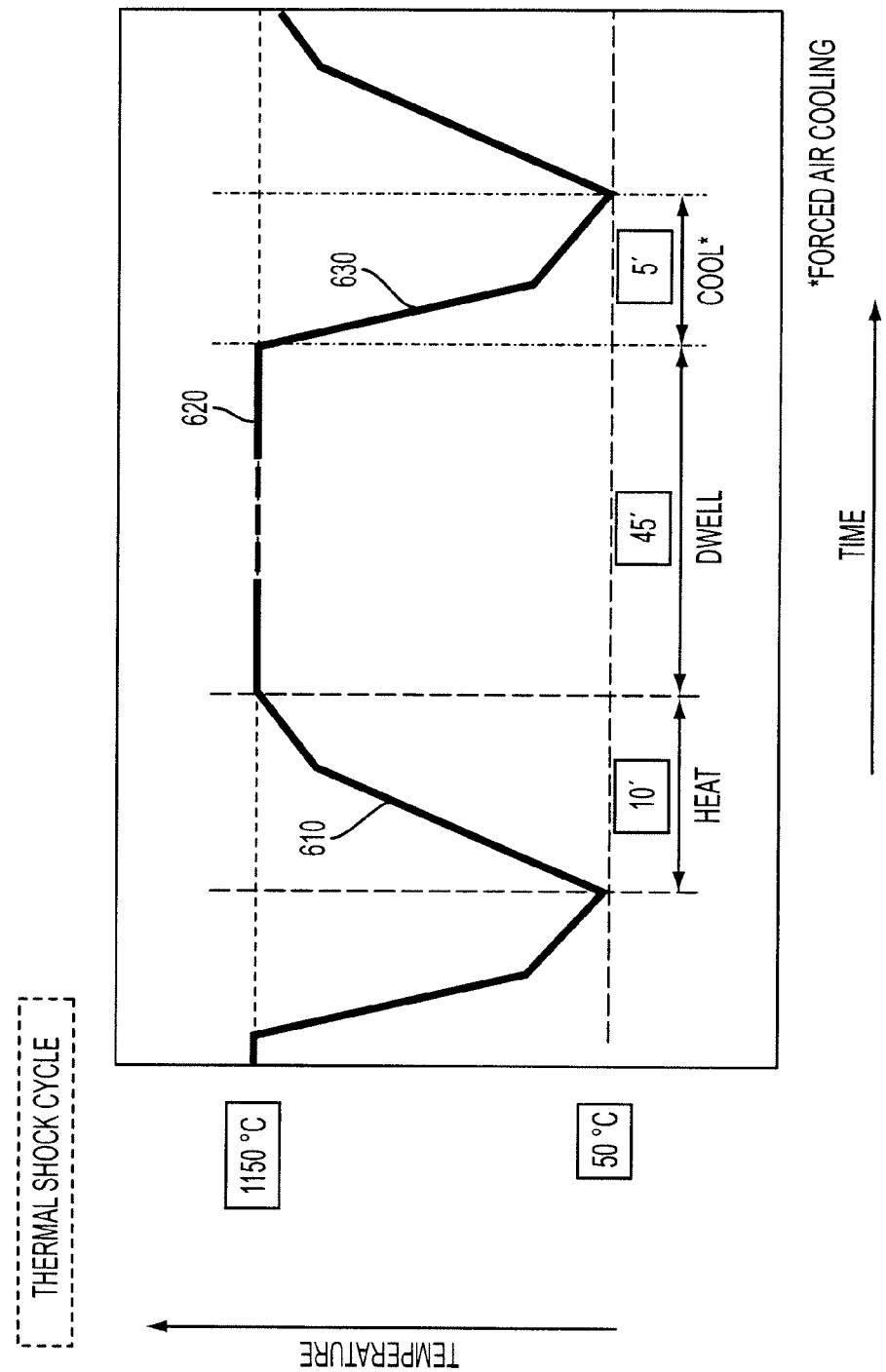
FIG. 6 illustrates a high temperature test method to test thermal shock and sintering resistance of abradable materials.

FIG. 6 shows the typical time/temperature curve to evaluate the thermal shock resistance of an abradable seal coating system 150 as described above. One thermal shock cycle consists of a rapid heating phase 610 to heat the coating system to 1150° C. in approximately 10 minutes, a soak period 620 during which the coating system is held at 1150° C. for 45 minutes and a 5 minute period 630 of rapid, forced air cooling to bring the coating system/abradable top coat to a temperature of 50° C. In the thermal shock test applied, rapid heating 610 of the coatings is achieved by elevating a sample holder or tray carrying several coating samples into an electrically heated furnace that is kept at the test set temperature of 1150° C. Rapid cooling 630 of the coating systems is achieved by lowering the sample tray and moving it out of the furnace and quenching the test coating systems with compressed air. As the cycle of FIG. 6 has a 45 minutes dwell time at test set temperature built into the test method, the thermal shock test as detailed here and employed to evaluate coating systems according to the present invention does also serve as a sintering test.

Figure 7:
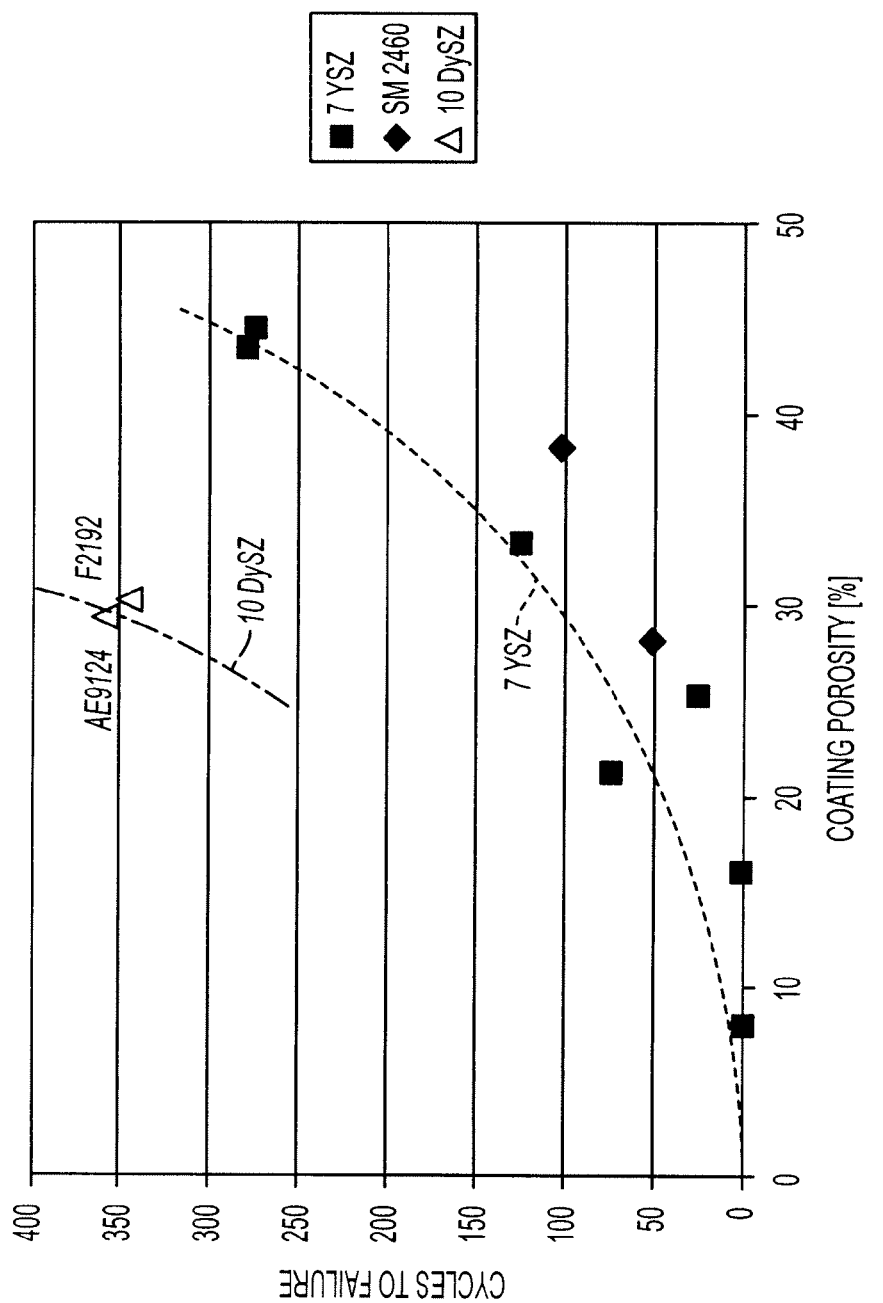
FIG. 7 shows the results of thermal shock/sintering performance of state-of-the art and novel ceramic abradable materials according to the present invention at 1150° C.

FIG. 7 shows the results of the thermal shock testing as described above for various coating systems as a function of their abradable top coat porosity. The top coats tested here and including the coatings in accordance with the present invention had a thickness of 1 mm or more. Generally, the data in FIG. 7 shows that use of coatings in accordance with embodiments of the present invention can result in a three- to four-fold improvement of the coating system's resistance to thermal shock loading when compared to the baseline abradable coating systems SM2460 and 7 YSZ.

Figure 8:
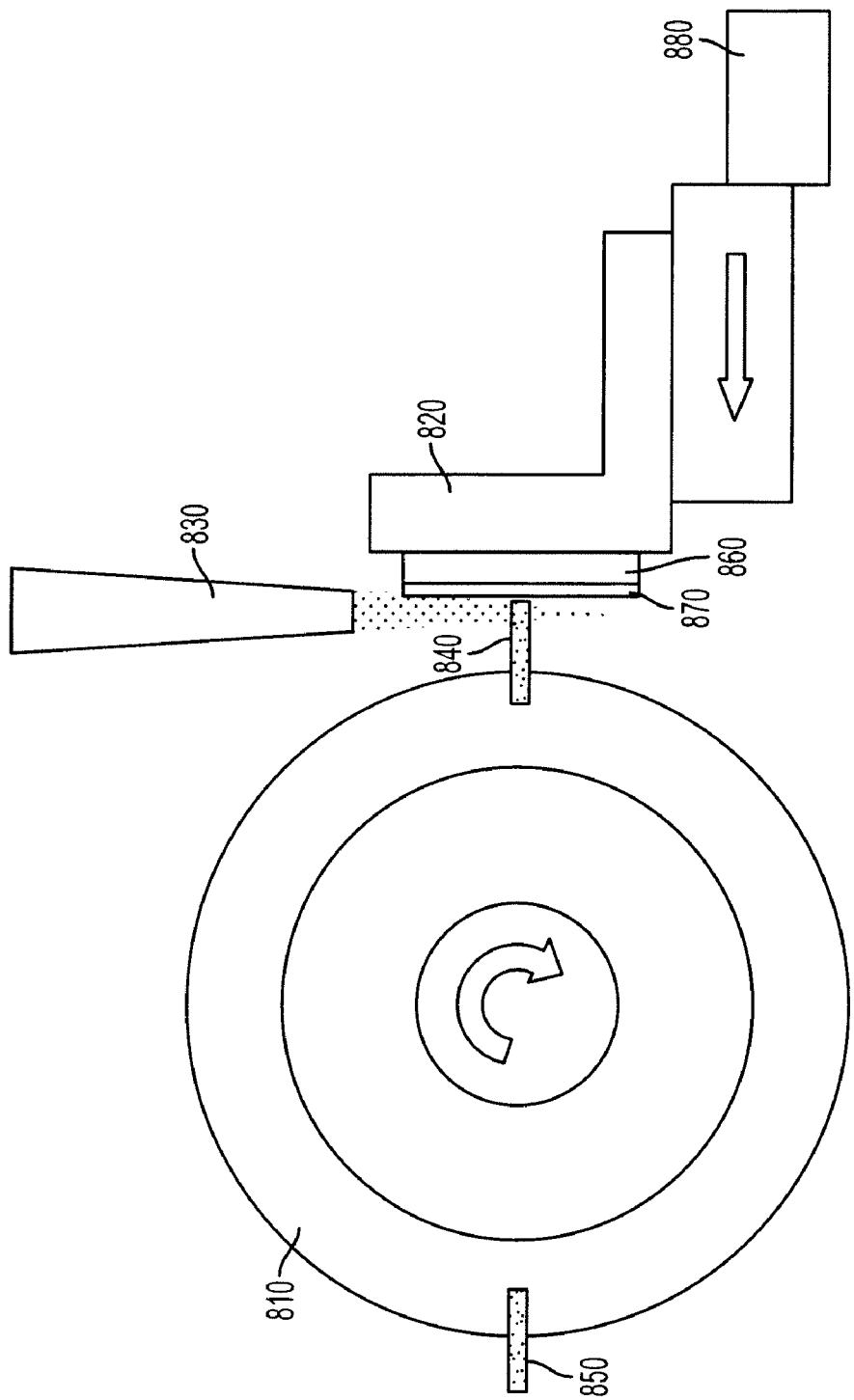
FIG. 8 describes a testing facility used to determine abradability of ceramic abradable materials.

FIG. 8 illustrates a test rig for testing the ceramic abradable top coat in accordance with the present invention. The test station shown in FIG. 8 is used to assess the abradability of the ceramic coating systems. In general it consists of a rotor disc 810, a movable specimen holder 820 and a heating device 830. A test blade 840 is mounted to the rotor disc 810 together with a balancing blade 850. The ceramic abradable test coating 860 which is deposited over a bond coat onto metal substrate 870 is driven towards the bladed rotor 810 by stepper motor 880. This set-up allows to drive the test blade 840 into the ceramic abradable test specimen under controlled incursion rates. The rotation of the disc imparts a certain speed to the tip of the test blade referred to as the blade tip speed. Blade tip speed and blade incursion rate together with the coating temperature are the three main set parameters to simulate certain turbine engine rub conditions. The heating device 830 can heat the abradable test coating 860 up to temperatures of 1200° C. Blades that rub against ceramic abradables are normally hard tipped as described above. It is worth noting that the tests described here employed untreated, bare tips of the blade dummies made from Inconel alloy 718.

Figure 9:
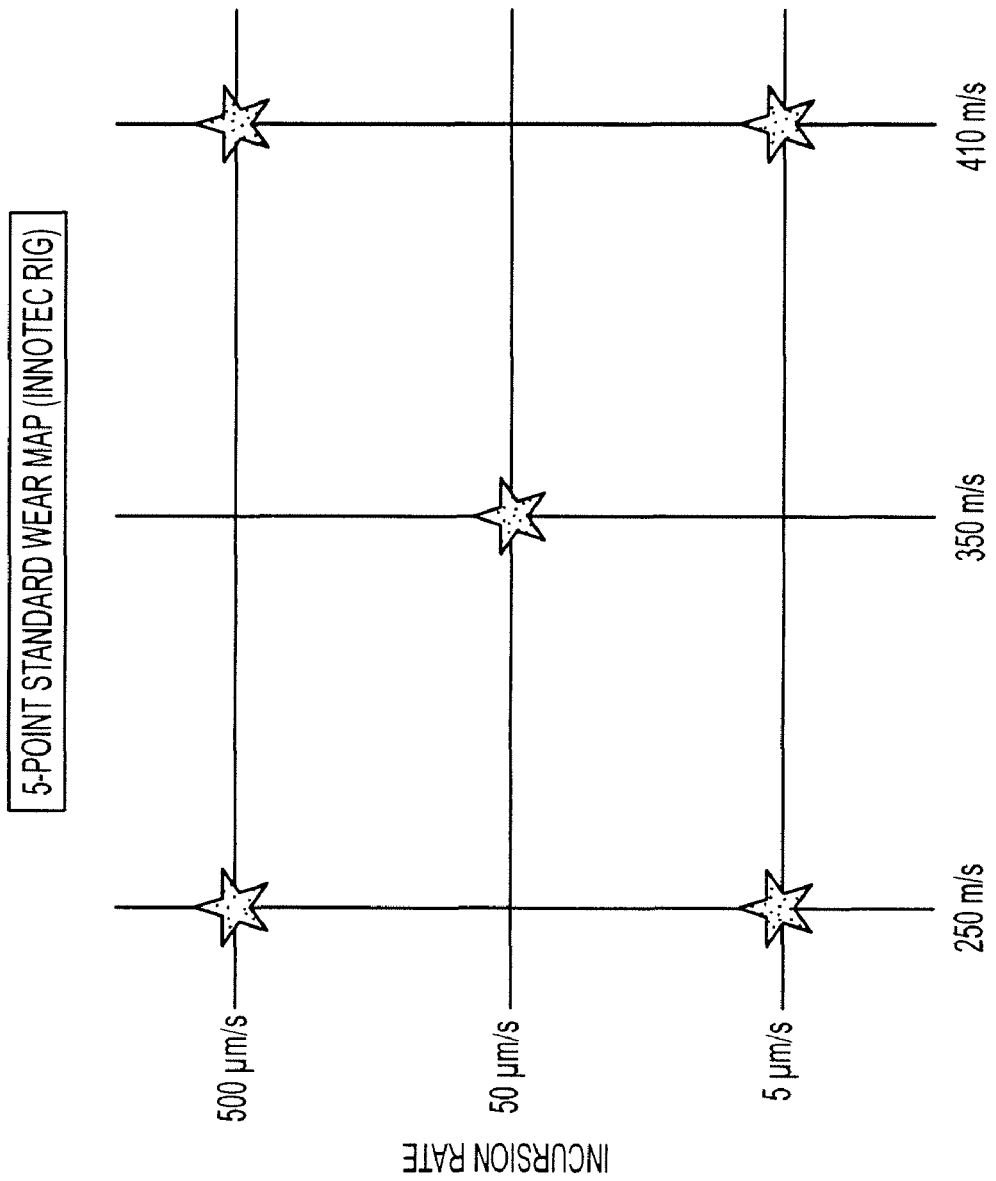
FIG. 9 illustrates a typical test matrix or "wear map" used to evaluate the abradability performance of abradable materials.
Figure 10C:
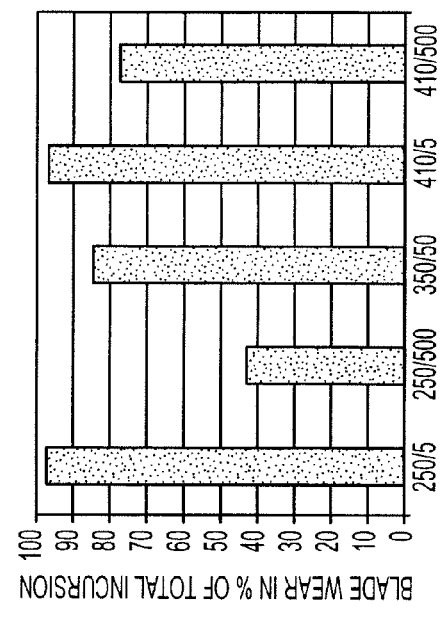
FIGS. 10A-C show the abradability results for state-of-the art and novel ceramic abradable materials according to the present invention for a test temperature of 1100° C. and test parameters as outlined in FIG. 9.
Figure 10A:
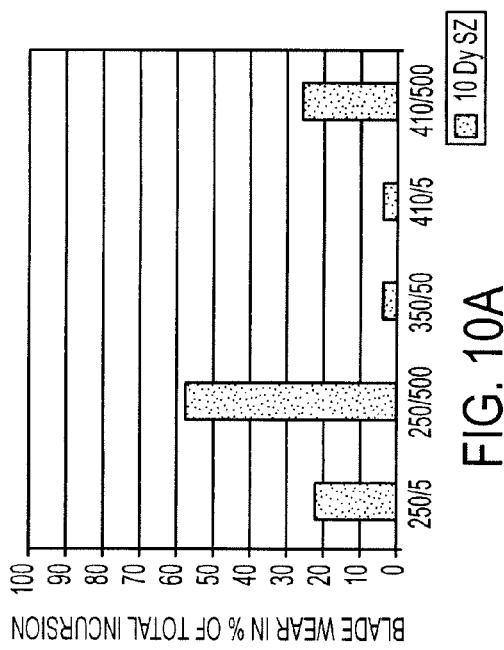
Figure 10B:
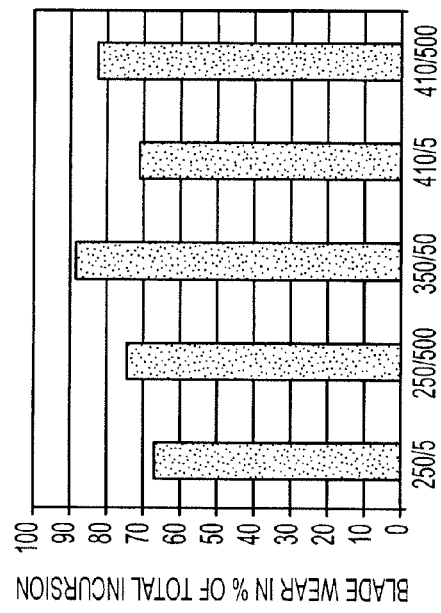

FIG. 9 shows a standard array of test conditions or "wear map" used to evaluate the abradability of coatings in accordance with embodiments of the present invention. The test conditions illustrated on the wear map give an overview of the nominal blade tip incursion conditions that might typically be encountered in an aero or power turbine. FIG. 10 shows the results of the abradability tests as the wear of an Inconel 718 test blade as a percentage of the total incursion depth, which is the displacement between blade tip and ceramic abradable coating surface from the point of first contact to the end of the test. A set incursion depth of 0.7 mm was selected. The tests were performed at 1100° C. FIG. 10 shows the results of abradability tests as defined above for (A) the 10 DySZ/ AMDRY 962 coating system in accordance with the present invention and shown in FIG. 3 and having 29.9 vol % of mainly polymer induced porosity in the DySZ top coat, (B) a 7 YSZ top coat with 23.9 vol % of mainly polymer induced porosity which is deposited over a nominally 170 µm thick bond coat made from AMDRY 962, and (C) an all metallic MCrAlY abradable made from AMDRY 995 with a porosity of less than 5 vol %. FIG. 10 shows that the 10 DySZ abradable coating according to the present invention exhibits the best overall abradability performance of the coatings tested. In particular, the 10 DySZ abradable coating shows little, generally acceptable blade wear for the test conditions with the high blade tip speeds of 350 and 410 m/s.

Figures 11A, 11B:
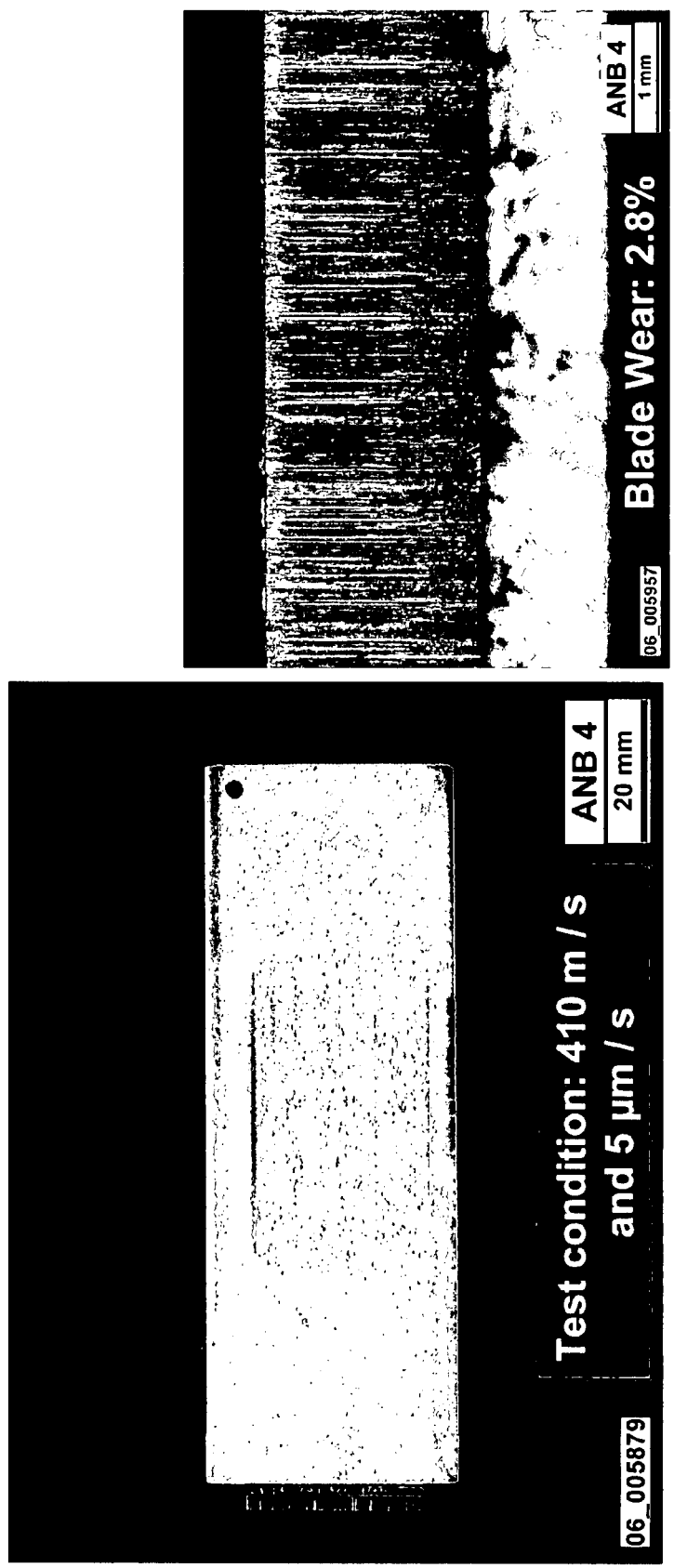

FIG. 11A shows the 10 DySZ (10 wt % $Dy_2O_3$ stabilized $ZrO_2$) top coat of the coating system (A) as described above. FIG. 11B shows the bare tip of a 2 mm wide Inconel 718 test blade that was rubbed against the top coat, and FIG. 11A shows the rub path cut into the ceramic coating by the blade at 1100° C. coating temperature, 410 m/s relative blade tip speed along the rub path and 5 µm/s incursion rate setting. As can be seen from FIGS. 11A-B, a clean rub path is cut into the ceramic abradable surface by the bare metallic tip while only very limited and uniform blade wear of 2.8% is observed.

Figures 12A, 12B:
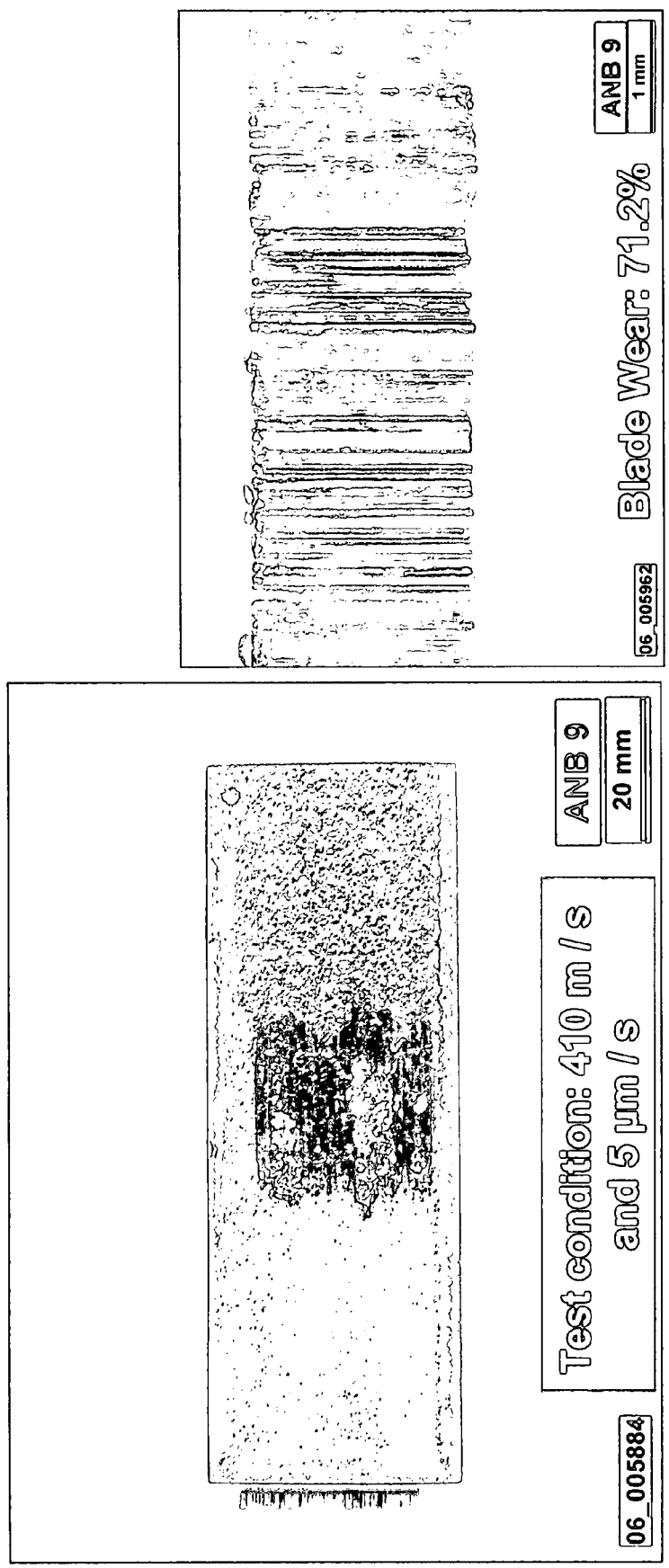

FIGS. 12A-B shows tip (FIG. 12B) and rub path condition (FIG. 12A) after a test (same test conditions as described above) for the 7 YSZ (7 wt % $Y_2O_3$ stabilized $ZrO_2$) top coat as described above under (B). Undesirable blade wear of more than 70% is shown in FIG. 12 B, and FIG. 12 A shows a discolored rub path resulting from blade metal smeared onto the ceramic during rub interaction become apparent. FIGS. 13A-B shows the all metallic MCrAlY coating (C) described above that was tested under the same conditions as described above with respect to FIGS. 11A-B and 12 A-B. As seen in FIGS. 13A-B, uniform but excessive blade wear becomes obvious.

Generally, the coating system according to the present invention comprising the wt % $Dy_2O_3$ stabilized $ZrO_2$ (10 DySZ) abradable top coat compares very favorably to state-of-the-art abradable systems for high temperature use by providing an overall improved performance profile of erosion resistance, thermal shock and sintering resistance and abradability or rub tolerance against untreated, bare metal blade tips. The latter, in particular, makes for a better performing product compared to typical baseline systems.

The powder material used to produce coatings according to embodiments of the present invention can be supplied in a number of conventional forms. Referring now to FIG. 14, a method of forming a powder for abradable ceramic coatings is provided. Generally the abradable top coat composition according to the present invention may be manufactured by a conventional spray dry process as shown in FIG. 14 where, in a first step, raw materials 1410 of zirconia and dysprosia are blended together in desired percentages as described earlier. In a next step this powder blend will be mixed together with water, defoamants and binder 1420 in a mixing tank 1430. The resulting mixture can be fed into a spray dry chamber 1440 through an atomization nozzle 1450 thereby creating small droplets 1460. Hot air 1470 is blown into the spray dry chamber 1440 which extracts water from the droplets 1460 thereby creating microsized, dried agglomerate particles 1380. After further screening and sizing, these agglomerate particles can form a spray-dried powder composition in accordance with the present invention. Prior to application of this powder by thermal spraying, it may be blended together with a porosity forming or fugitive filler phase such as a polymer (e.g. polyester powder). Alternatively the pore forming, fugitive filler may be incorporated into the spray dried agglomerate particle 1480 by feeding a blend of zirconia, dysprosia and pore forming phase (e.g. polyester) into the mixing tank 1430 and then, after mixing with binder and water, into the spray dry chamber.

Figure 16:
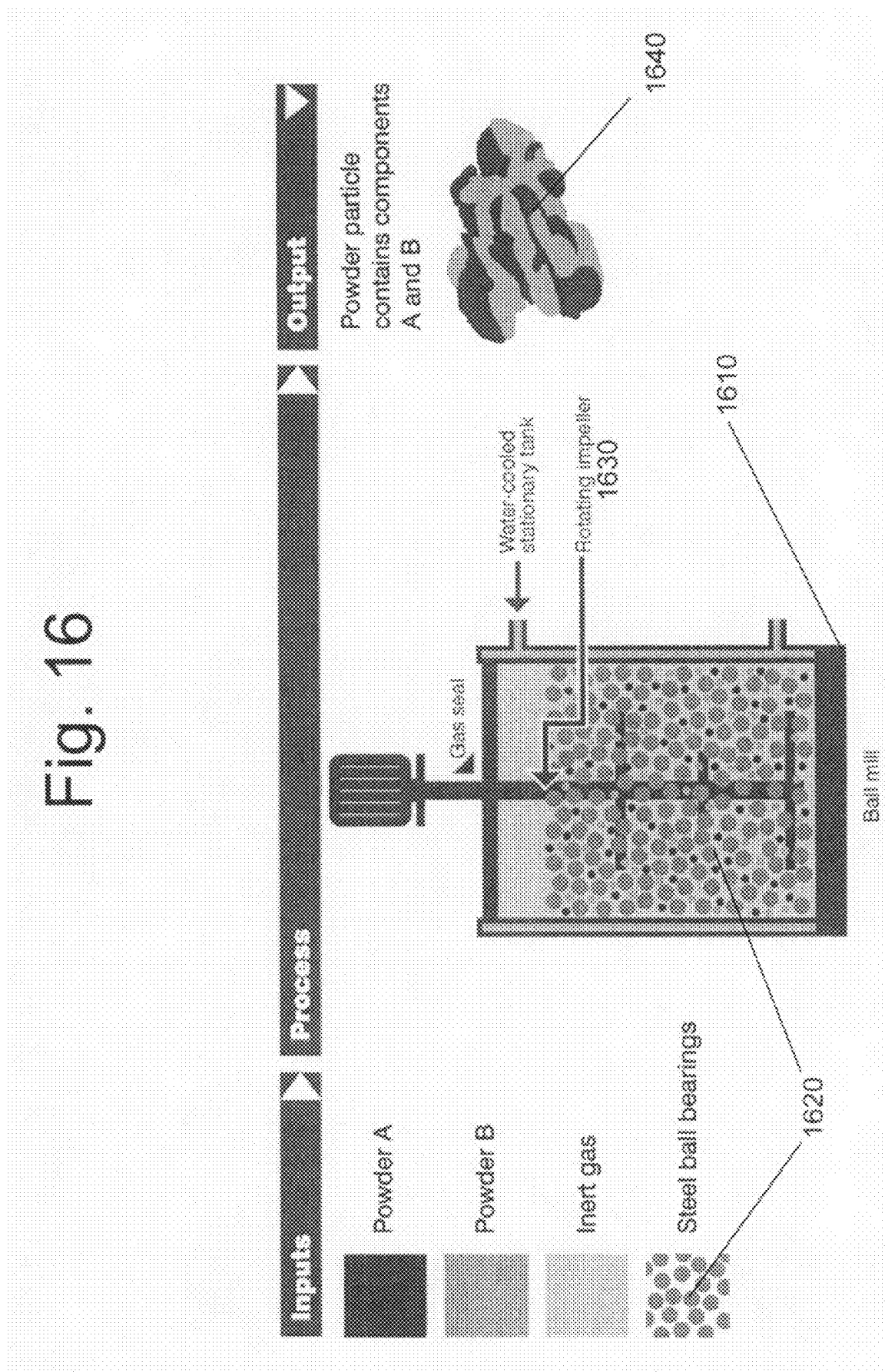
FIG. 16 illustrates a method of providing a polymer/ceramic compound material which, in one of the preferred embodiments of the present invention, is used as a porosity generating addition to a ceramic abradable material.

Spray dried agglomerate particles 1480 consisting of zirconia, dysprosia and binder according to the present invention may be further processed by plasma densification to spheroidize the powder particles to improve powder flow properties and to homogenize and stabilize the powder. FIG. 15 shows a method of achieving this by feeding the spray dried powder 1480 into a plasma plume 1510 that is generated by a plasma gun 1520. While the powder particles are traveling in the plasma 1510 the binder phase is burnt off and the constituents of the agglomerated particles are molten and fused together to form a solid solution. Further, from a fully molten particle stage 1530, the particle travels a distance 1540 which is given by the time to cool to a solid state. At that point and due to certain effects during the cooling phase 1530 the particles typically attain a hollow sphere shape. This plasma densified, ceramic hollow sphere powder is typically blended with a porosity forming filler phase such as polyester or a compound consisting of organic (polyester) and a "dislocator" phase. FIG. 16 shows a preferred method of providing a compound of organic and dislocator phase to function as a porosity forming material by attrition milling. Powder A, an organic or polyester, and powder B, a dislocator such as hexagonal Boron Nitride (BN) are filled into a ball mill reactor 1610 together with a certain weight of steel balls 1620. The mixture consisting of steel balls and powders A and B is put in motion by an impeller 1630. The motion causes multiple collisions of the steel balls in the attrition mill reactor. For a certain number of such collision events, particles of powders A and B are entrapped between the colliding steel balls whereby the powder particles are forged together. Repeated forging together and breaking up of particles causes a final powder product 1640 that consists of constituents A and B, typically in a layered morphology. This attrition or ball milling process has the advantage of generating only little processing heat and this low temperature, solid state technique is advantageously applied to process constituents that are limited in their temperature capabilities.

Plasma processing/densification of the above described type of spray dried dysprosia/zirconia to produce a $Dy_2O_3$/$ZrO_2$ solid solution in the form of a powder comprised of hollow sphere particles, followed by screening and final sizing and finally blending this ceramic abradable powder with a compound of polyester and hexagonal Boron Nitride (BN) that was prepared by attrition milling as described above and serving the purpose of forming porosity in the final coating, represents a preferred material for producing ceramic abradable coatings according to the present invention. The porous top coat represented in FIG. 3 and giving superior thermal shock resistance and abradability as per FIGS. 7, 10 and 11 was prepared in such a way, as a blend of 95 wt % of 9-11 wt % $Dy_2O_3$ stabilized $ZrO_2$ prepared by spray drying followed by plasma densification as described in FIG. 14 and 5 wt % of an attrition milled compound of fully aromatic polyester and hexagonal Boron Nitride prepared by the processing route depicted in FIG. 15. This material deposited over a metallic bond coat by thermal spraying, preferably plasma spraying, represents a preferred embodiment of the present invention.

While the preferred embodiments of the present invention have been shown and described herein, it will be obvious that such embodiments are provided by way of example only. Numerous variations, changes and substitutions will occur to those skilled in the art without departing from the invention herein. Accordingly, it is intended that the invention be limited only by the spirit and scope of the appended claims.

We claim:

1. An abradable ceramic seal material for use in abradable coatings, said material comprising dysprosia ($Dy_2O_3$), zirconia ($ZrO_2$) and a porosity generating filler phase comprising polyester and a hexagonal boron nitride solid lubricant.

2. The material in accordance with claim 1, wherein the concentration of dysprosia is 2 to 50 wt %.

3. The material in accordance with claim 1, wherein the material is in a powder form and wherein individual powder particles contain smaller sub-particles of dysprosia and zirconia which are agglomerated by a binder phase.

4. The material in accordance with claim 3, wherein the powder has been exposed to sufficient heat for a sufficient period of time to (a) burn the binder phase off and (b) fuse or sinter the dysprosia and zirconia sub-particles together to provide a stable, alloyed ceramic phase which may be further processed by crushing and/or screening and/or sizing to provide a stabilized, thermally sprayable ceramic abradable material.

5. The material in accordance with claim 4, wherein the stabilized, thermally sprayable ceramic powder material has generally spherical particles with an average size of between about 10 and 160 µm.

6. The material in accordance with claim 4, wherein the stabilized, thermally sprayable ceramic powder material is blended with the porosity generating filler material.

7. The material in accordance with claim 1, wherein the material is in a powder form and wherein each individual powder particle contains dysprosia, zirconia and the porosity generating filler phase.

8. The material in accordance with claim 1, which, when thermally sprayed, forms an abradable seal coating deposited on a metallic substrate that optionally carries on the substrate a metallic intermediate layer or bond coat.

9. The coating in accordance with claim 8, wherein the coating has a porosity of between 2 and 50 vol %.

10. The coating in accordance with claim 8, wherein the metallic substrate is a turbine engine shroud or casing.

11. The coatings in accordance with claim 10, wherein the turbine engine shroud is in the form of an integral or a segmented ring.

12. A stage of a turbine engine comprising at least one turbine blade, a shroud or casing housing the at least one turbine blade and an abradable seal coating deposited between the at least one turbine blade and the shroud or casing, wherein the abradable seal coating is formed from the material in accordance with claim 1.

13. A stage of turbine engine in accordance with claim 12, wherein the at least one turbine blade is an unshrouded blade and has a bare, untreated blade tip.

14. The stage of a turbine engine in accordance with claim 13, wherein the dysprosia stabilized zirconia includes, apart from impurities, 8 to 12 wt % dysprosia.

15. The stage of a turbine engine in accordance with claim 12, wherein the dysprosia stabilized zirconia includes 2 to 50 wt % of dysprosia.

16. An abradable seal coating comprising a ceramic seal material having dysprosia ($Dy_2O_3$), zirconia ($ZrO_2$), and a porosity generating filler phase comprising polyester and a hexagonal boron nitride solid lubricant said material applied to a metal substrate.

17. The coating of claim 16, wherein said material is applied to a metal substrate or to a metallic intermediate layer or bond coat.

18. The coating of claim 17, wherein the dysprosia stabilized zirconia includes 2 to 50 wt % of dysprosia.

19. A method of producing an abradable coating comprising:
providing dysprosia ($Dy_2O_3$) stabilized zirconia ($ZrO_2$) material in powder form;
adding a polyester/hBN compound fugitive filler to the dysprosia stabilized zirconia powder;
depositing the material and filler onto a metal substrate and/or optional bond coat using a thermal spray process; and
burning out the filler from the sprayed material by heat treating the resultant coating.

20. The method of claim 19, wherein the dysprosia stabilized zirconia material includes 2 to 50 wt % of dysprosia.

21. The method of claim 19, wherein the filler is about 0.3 to 15 wt % of the material and filler prior to using the thermal spray process to deposit the material and filler.

* * * * *